(12) United States Patent
Walker

(10) Patent No.: US 11,630,299 B1
(45) Date of Patent: Apr. 18, 2023

(54) AMPLIFIED DEFORMABLE MIRROR

(71) Applicant: Arizona Board of Regents on Behalf of the University of Arizona, Tucson, AZ (US)

(72) Inventor: Christopher K. Walker, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 248 days.

(21) Appl. No.: 16/863,676

(22) Filed: Apr. 30, 2020

Related U.S. Application Data

(60) Provisional application No. 62/840,651, filed on Apr. 30, 2019.

(51) Int. Cl.
| | |
|---|---|
| G02B 26/08 | (2006.01) |
| G02B 27/00 | (2006.01) |
| G02B 1/11 | (2015.01) |

(52) U.S. Cl.
CPC ..... *G02B 27/0068* (2013.01); *G02B 26/0825* (2013.01); *G02B 1/11* (2013.01); *G02B 26/0833* (2013.01)

(58) Field of Classification Search
None
See application file for complete search history.

(56) References Cited

U.S. PATENT DOCUMENTS

| | | | |
|---|---|---|---|
| 2004/0125472 A1* | 7/2004 | Belt | G02B 26/0858 359/849 |
| 2012/0206784 A1* | 8/2012 | Chan | G02B 26/101 359/212.1 |
| 2015/0277099 A1* | 10/2015 | Hong | G09G 3/2003 438/57 |

* cited by examiner

*Primary Examiner* — Derek S. Chapel
(74) *Attorney, Agent, or Firm* — Thomas | Horstemeyer, LLP

(57) ABSTRACT

Various examples are provided related to amplified deformable mirrors (ADMs). In one embodiment, an ADM includes a deformable mirror and a flexible dielectric matrix deposited on a front side of the deformable mirror. A pathlength of a wavelength, $\lambda_o$, of electromagnetic radiation passing through the dielectric matrix can be amplified by a distribution of dielectric particles embedded in the dielectric matrix.

10 Claims, 2 Drawing Sheets

Amplified Deformable Mirror. Cross-sectional View

Amplified Deformable Mirror. Cross-sectional View

US 11,630,299 B1

AMPLIFIED DEFORMABLE MIRROR

CROSS REFERENCE TO RELATED APPLICATIONS

This application claims priority to, and the benefit of, U.S. provisional application entitled "Amplified Deformable Mirror" having Ser. No. 62/840,651, filed May 30, 2019, which is hereby incorporated by reference in its entirety.

BACKGROUND

Many optical systems, such as telescopes or other image capture devices, utilize mirrors. Atmospheric conditions or aberrations within the optical system can produce distortions affecting the captured images. Wavefront corrections may offer improvements in system performance.

SUMMARY

Aspects of the present disclosure are related to amplified deformable mirrors (ADMs). In one aspect, among others, an ADM comprises a deformable mirror and a flexible dielectric matrix deposited on a front side of the deformable mirror. A pathlength of a wavelength, $\lambda_0$, of electromagnetic radiation passing through the dielectric matrix can be amplified by a distribution of dielectric particles embedded in the dielectric matrix. The dielectric particles can have a particle index of refraction ($n_p$) that is greater than a matrix index of refraction ($n_M$) of a material forming the flexible dielectric matrix. The particle index of refraction ($n_p$) can be much greater than a matrix index of refraction ($n_M$) of the material forming the flexible dielectric matrix ($n_p \gg n_M$).

In one or more aspects, a material forming the flexible dielectric matrix can comprise latex or polyurethane. A material forming the flexible dielectric matrix can be flexible within a defined range of operational temperatures or a defined range of operational pressures. In some aspects, an average diameter ($D_p$) of the dielectric particles can be a subwavelength of the wavelength of operation. the $D_p$ is less than or equal to one tenth of the wavelength $\lambda_0$. A material forming the dielectric particles can comprise silicon, gallium or germanium. In various aspects, the ADM can comprise a coating disposed on a side of the flexible dielectric matrix opposite the deformable mirror. The coating can be an anti-reflective (AR) coating. The ADM can comprise a coating disposed on a second side of the deformable mirror.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
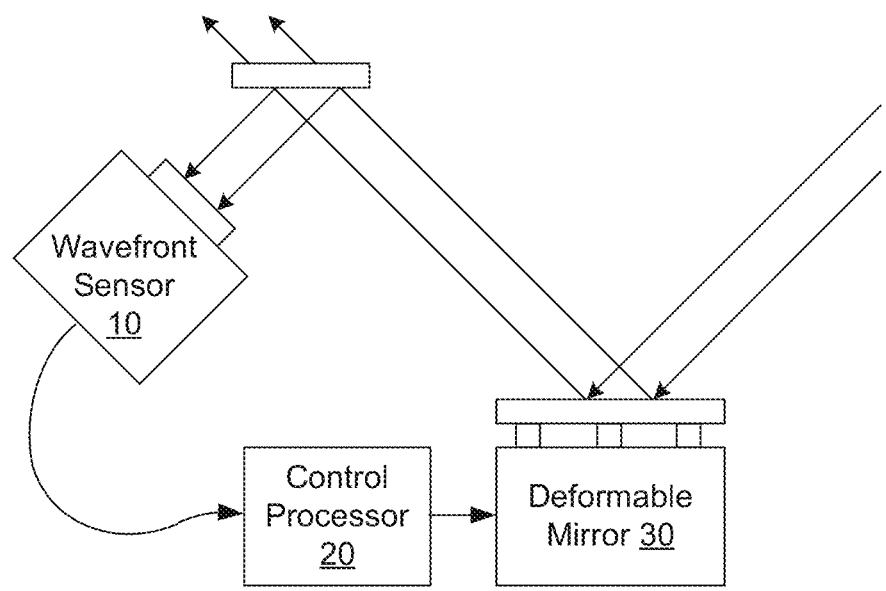
FIG. 1A illustrates an example of an adaptive optical system, in accordance with various embodiments of the present disclosure.

Disclosed herein are various examples related to amplified deformable mirrors (ADMs). Reference will now be made in detail to the description of the embodiments as illustrated in the drawings, wherein like reference numbers indicate like parts throughout the several views.

FIG. 1A illustrates an adaptive optical system capable of correcting wavefront irregularities. The adaptive optical system can include a wavefront sensor 10, control processor 20, and a deformable mirror (DM) 30. In the adaptive optical system, the wavefront sensor 10, which is typically referred to as a Hartmann-Shack sensor, can measure the irregularities or phase errors in light reflected from the deformable mirror 30. The control processor 20 can analyzes the measurement signal from the wavefront sensor 10 and control the shape of deformable mirror 30 to eliminate the measured wavefront irregularities.

Wavefront sensors 10 can discretize the reflected wavefront via a lenslet array in front of a focal plane array. The focal plane array can be any array of photoelectric sensing element such as a CCD sensor array in a digital camera. The deformable mirror 30 can be a thin mirror with an array of tightly packed piston actuators. The actuators can be stacks of piezoelectric disks or other microelectromechanical system (MEMS) that can control the mirror topology. Alternatively, the mirror can comprise a thin glass or metal sheet or thin metallized dielectric membrane whose outer edges are stressed in such a way as to distort the reflective surface in the desired manner.

Figure 1B:
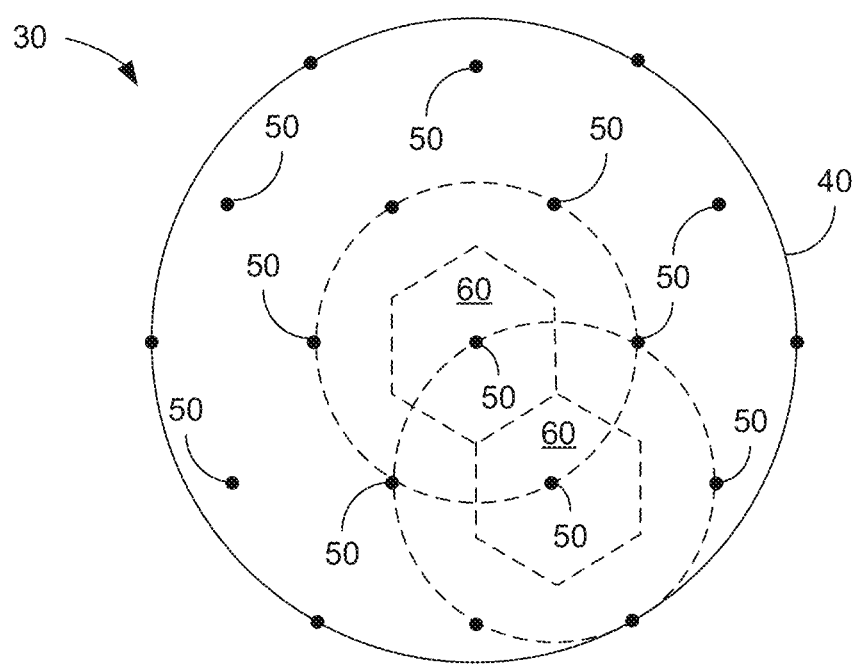
FIG. 1B illustrates an example of a deformable mirror for the adaptive optical system of FIG. 1A, in accordance with various embodiments of the present disclosure.

FIG. 1B is a plan view of an example of a deformable mirror 30, which includes a mirror membrane 40 and a set of actuators 50. Mirror membrane 40 can be made of a reflective material that in the embodiment of FIG. 1B can be flat when actuators 50 have their unactuated lengths. Alternatively, mirror membrane 40 can have any desired unactuated shape, depending on the desired optical function or functions. In the example of FIG. 1B, the actuators 50 are positioned on a hexagonal lattice and can extend or contract to change the shape of the mirror membrane 40 to provide for phase correction and/or the other optical functions of the deformable mirror 30.

Deformable mirror 30 can include an array of mirror elements comprising an actuator element 50 and a hexagonal portion 60 of the continuous mirror membrane 40. A circular edge can circumscribe the actuators 50 in the array. The boundary condition at the edge can be fixed supported by flexures or can be adjustable using actuator elements 50. The hexagonal packing can give an optimal packing density and is the nearest to Gaussian form, versus a square packing.

Here is described an approach by which the changes in pathlength provided by a deformable mirror (DM) are amplified by way of a custom engineered, dielectric layer. A DM is a mirror whose surface can be deformed to modulate the wavefront of an incoming wave or ray. DMs can be used in optical systems to correct for wavefront errors caused by aberrations within the optical system or the atmosphere.

DMs typically include a thin mirror whose surface is controlled by the push and pull of magnetic or piezoelectric actuators. The "throw" or maximum deformation achievable by a DM often limits how severe a wavefront distortion can be corrected. U.S. Patent Application Publication No. 2004/0125472 to R. T. Belt, entitled "Actuated Deformable Membrane Mirror," which is hereby incorporated by reference in its entirety, describes various examples of deformable mirrors and actuator arrays. Since the required distortion scales with the wavelength, $\lambda_b$, of the electromagnetic radiation being used, the ability to correct or modulate wavefronts with a DM becomes increasingly problematic at long wavelengths (i.e., low frequencies).

Figure 2:
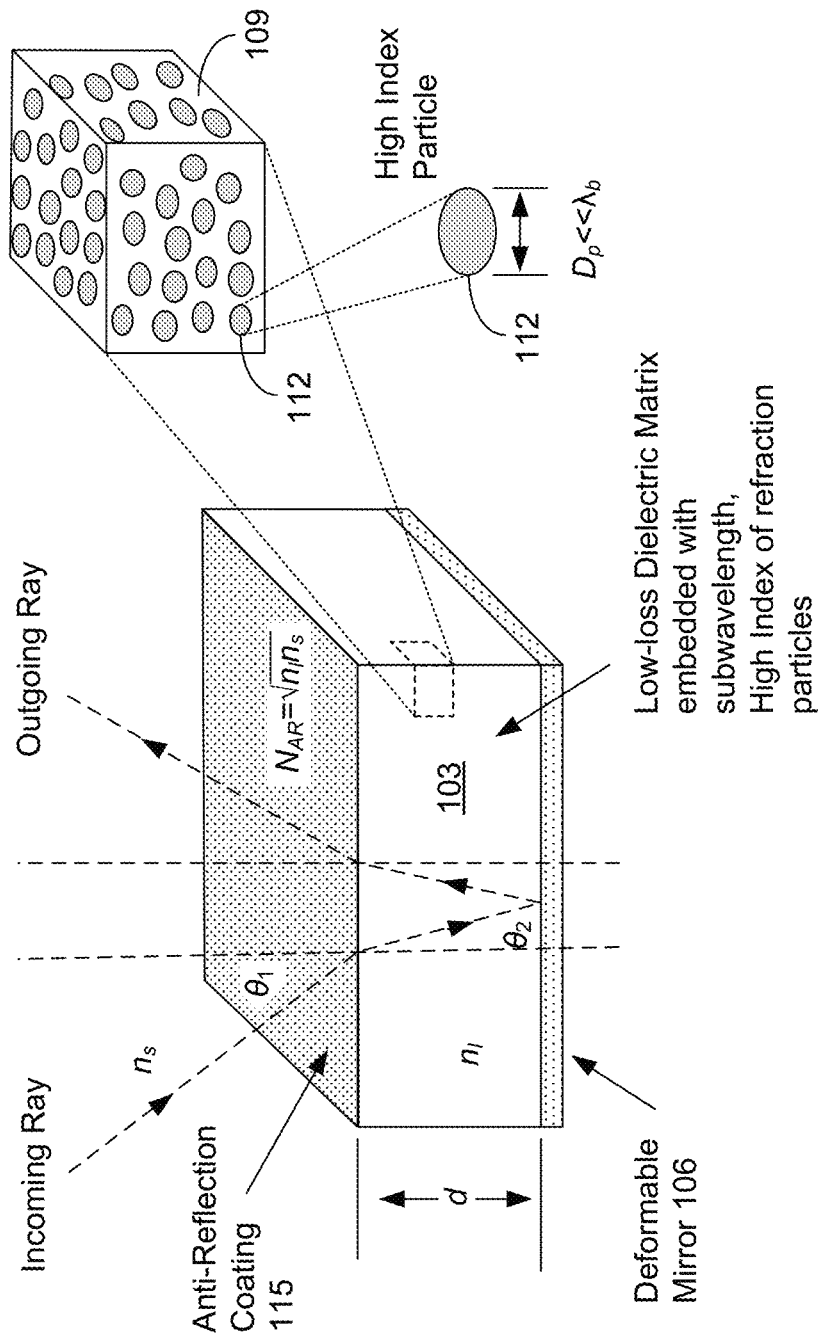
FIG. 2 is a cross-sectional view illustrating an example of an amplified deformable mirror (ADM), in accordance with various embodiments of the present disclosure.

FIG. 2 illustrates an example of an amplified deformable mirror (ADM) including a dielectric matrix embedded with subwavelength particles with a refractive index greater than that of the surrounding medium. The effective change in pathlength, $\Delta d_{\text{eff}}$, provided by a DM can be amplified by the application of a dielectric layer 103 of thickness, d, and index of refraction, $n_l$, to a DM 106 as described by:

$$\Delta d_{\text{eff}} = n_l \Delta d = \sqrt{\varepsilon_l} \, \Delta d, \tag{1}$$

where $\varepsilon_l$ is the relative permittivity of the dielectric layer 103. The net amplification of a pathlength, $\alpha_p$, provided by the dielectric layer 103 is:

$$\alpha_p = \frac{n_l}{n_s}, \tag{2}$$

where $n_s$ is the refractive index of the surrounding medium.

The relationship between the angles of incidence, $\theta_1$, and refraction, $\theta_2$, is governed by Snell's law.

$$\frac{\sin\theta_2}{\sin\theta_1} = \frac{n_l}{n_s}. \tag{3}$$

For the layer 103 of dielectric material to be useful in this application, it needs to be deformable and low-loss at the wavelength of the electromagnetic radiation, $\lambda_0$. Such a layer can be engineered by utilizing a low-loss, flexible dielectric matrix material 109 with refractive index $n_M$. Such low-loss, flexible dielectric matrix material 109 can include, e.g., latex, polyurethane, or other appropriate material or combination of materials that are flexible at the temperatures and pressures under which the system is designed to operate. For example, a "designer" dielectric may be created from a combination of materials to achieve a desired index of refraction. The dielectric matrix material 109 can be embedded with low-loss, high index of refraction dielectric particles 112 with diameter, $D_p \leq \lambda_0 / 10 n_l$, and refractive index, $n_p$. Such dielectric particles 112 can be made from, e.g., silicon, gallium, germanium, or other appropriate (high dielectric) material or combination of materials. The embedded particle material can be adjusted to achieve a range of additional properties including finely tuning the index of refraction to a specific wavelength. In some embodiments, a mix of particles made of different materials may be used to achieve the desired results. For values of $n_p > n_M$, where the higher index of refraction particles constitute >90% of the engineered layer volume, the refractive index of the layer $n_l \rightarrow n_p$, and $D_p$ can be determined from:

$$D_p \leq \frac{\lambda_0}{10 n_p}. \tag{4}$$

With this approach, the effective throw of a DM can be increased by a factor of 4 or more.

If desired, a coating 115 can be applied to the top of the engineered dielectric material 103. The coating 115 can be, e.g., an anti-reflective (AR) coating or another dielectric material. The index of refraction of the matching layer, $n_{AR}$, can be determined from:

$$n_{AR} = \sqrt{n_l n_s}. \tag{5}$$

A second coating layer may be applied over the first coating 115, e.g., to increase the effective bandwidth of operation. In some implementations, another coating can be applied to the back side of the DM 106 to balance the difference in thermal expansion coefficients between the DM 106 and dielectric layer 103. This other coating can be a dielectric or other appropriate coating material suitable for compensating for the different expansion rates to avoid stress or strain on the DM 106.

An engineered layer can be created by mixing in an appropriate amount of high dielectric material into a container of lower dielectric, flexibile material before that material is cured. An example implementation for use at far-infrared wavelengths would be fine silicon powder mixed with polyethylene, polytetrafluoroethylene (PTFE) (e.g., Teflon®), or latex.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that do not negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%)

within the indicated range. The term "about" can include traditional rounding according to significant figures of numerical values. In addition, the phrase "about 'x' to 'y'" includes "about 'x' to about 'y'".

Therefore, at least the following is claimed:

1. An amplified deformable mirror (ADM), comprising:
   a continuous deformable mirror supported by a plurality of actuators; and
   a flexible dielectric matrix deposited on a front side of the continuous deformable mirror where a pathlength of a wavelength, $\lambda_0$, of electromagnetic radiation passing through the dielectric matrix is amplified by a distribution of dielectric particles embedded in the dielectric matrix.

2. The ADM of claim 1, wherein the dielectric particles have a particle index of refraction ($n_p$) that is greater than a matrix index of refraction ($n_M$) of a material forming the flexible dielectric matrix.

3. The ADM of claim 1, wherein a material forming the flexible dielectric matrix comprises latex or polyurethane.

4. The ADM of claim 1, wherein a material forming the flexible dielectric matrix is flexible within a defined range of operational temperatures or a defined range of operational pressures.

5. The ADM of claim 1, wherein an average diameter ($D_p$) of the dielectric particles is a subwavelength of the wavelength of the electromagnetic radiation.

6. The ADM of claim 5, wherein the $D_p$ is less than or equal to one tenth of the wavelength $\lambda_0$.

7. The ADM of claim 1, wherein a material forming the dielectric particles comprises silicon, gallium or germanium.

8. The ADM of claim 1, comprising a coating disposed on a side of the flexible dielectric matrix opposite the continuous deformable mirror.

9. The ADM of claim 8, wherein the coating is an anti-reflective (AR) coating.

10. The ADM of claim 1, comprising a coating disposed on a second side of the continuous deformable mirror.

* * * * *